United States Patent [19]
Melnyk et al.

[11] Patent Number: 5,995,609
[45] Date of Patent: Nov. 30, 1999

[54] NUMBER PORTABILITY FOR A CLUSTER OF SWITCHES

[75] Inventors: Allan Melnyk, Kanata; Ronald Schwartz, Nepean, both of Canada; Pat Carstensen, Durham, N.C.

[73] Assignee: Nortel Networks Corporation, Montreal, Canada

[21] Appl. No.: 08/773,906

[22] Filed: Dec. 27, 1996

[51] Int. Cl.$^6$ .............................. H04M 3/42; H04M 7/00
[52] U.S. Cl. ..................... 379/207; 379/211; 379/221; 379/225
[58] Field of Search ................................. 379/207, 210, 379/211, 212, 219, 220, 221, 222, 224, 225, 229, 230, 913

[56] References Cited

U.S. PATENT DOCUMENTS

| | | | |
|---|---|---|---|
| 4,754,479 | 6/1988 | Bicknell et al. | 379/207 |
| 5,255,315 | 10/1993 | Bushnell | 379/221 |
| 5,583,929 | 12/1996 | Ardon | 379/230 |
| 5,625,681 | 4/1997 | Butler, II | 379/220 X |
| 5,689,555 | 11/1997 | Sonnenberg | 379/220 |
| 5,717,749 | 2/1998 | Sneed, Jr. et al. | 379/207 |
| 5,764,745 | 6/1998 | Chan et al. | 379/220 X |
| 5,793,857 | 8/1998 | Barnes et al. | 379/220 X |

OTHER PUBLICATIONS

"Generic Switching and Signalling Requirements for Number Portability" (FSD30-12-0001); Nov. 20, 1995 by the Illinois Number Portability Workshop.

*Primary Examiner*—Harry S. Hong
*Attorney, Agent, or Firm*—Foley & Lardner

[57] ABSTRACT

To provide station number portability within a cluster of switches interconnected in a communication switching network each switch within the cluster is provided with two translation tables stored in the main memory of the switch processor. When digits are dialled to connect a station with another station the office code of the dialled station is extracted and if this is an office code of any switch in the cluster the first translation table instructs that a translation be carried out in the second table. The second table contains all the station numbers which are in the cluster and relates these numbers either to a physical line or to an instruction to route to another switch. When a station is "ported" i.e., physically disconnected from one switch and reconnected to another switch, a minor change is made to the second translation table of the two switches to retain portability.

19 Claims, 6 Drawing Sheets

Switch A Translation Tables

3 / 6 Digit Translation Table — 28

| Digit | Outcome / Route |
|---|---|
| 000 to 010 | Treatment (Invalid) |
| 011 | Toll (Route to AT) |
| ... | ... |
| 609 345 | Do 7/10 translation |
| ... | ... |
| 609 567 | Do 7/10 translation |
| ... | ... |
| 609 789 | Do 7/10 translation |
| ... | ... |
| 609 987 | Route to Local Tandem |
| ... | ... |
| 909 654 | Toll (Route to AT) |
| ... | ... |
| 999 | Toll (Route to AT) |

7/10 Digit Translation Table — 30

| Digit | Outcome / Route |
|---|---|
| 609345 0000 | Vacant |
| 609345 0001 | Route to SW B |
| ... | ... |
| 609345 9999 | Line 3459999 |
| 609567 0000 | Route to SW B |
| ... | ... |
| 609567 1234 | Route to Sw C |
| ... | ... |
| 609789 0000 | Vacant |
| 609789 0001 | Line 7890001 |
| ... | ... |
| 609789 1234 | Route to Sw C |
| ... | ... |
| 609789 9999 | Vacant |

Switch C Translation Tables

3 / 6 Digit Translation Table — 28'

| Digit | Outcome / Route |
|---|---|
| 000 to 010 | Treatment (Invalid) |
| 011 | Toll (Route to AT) |
| ... | ... |
| 609 345 | Do 7/10 translation |
| ... | ... |
| 609 567 | Do 7/10 translation |
| ... | ... |
| 609 789 | Do 7/10 translation |
| ... | ... |
| 609 987 | Route to Local Tandem |
| ... | ... |
| 909 654 | Toll (Route to AT) |
| ... | ... |
| 999 | Toll (Route to AT) |

7/10 Digit Translation Table — 30'

| Digit | Outcome / Route |
|---|---|
| 609345 0000 | Vacant |
| 609345 0001 | Route to SW B |
| ... | ... |
| 609345 9999 | Route to Sw A |
| 609567 0000 | Route to SW B |
| ... | ... |
| 609567 1234 | Line 5671234 |
| ... | ... |
| 609789 0000 | Vacant |
| 609789 0001 | Route to Sw A |
| ... | ... |
| 609789 1234 | Line 7891234 |
| ... | ... |
| 609789 9999 | Vacant |

Switch A Translation Tables

Switch C Translation Tables

NUMBER PORTABILITY FOR A CLUSTER OF SWITCHES

BACKGROUND OF THE INVENTION

This invention relates to communications switching networks and more particularly to providing portability to station numbers within the network.

Within the public telecommunications switching network, there is an increasing need and desire to provide station number portability such that a subscriber may retain a given station number regardless of where the subscriber and station physically reside and which switch provides service.

Presently, the public switching telephone network (PSTN) relies on a relationship between the station number (Directory Number—DN) and the switch node that it is served by. Basically, the public numbering plan is organized as follows:

All DN's are of the form NPA-NXX-XXXX.

Each NPA is a three digit code representing a geographic area of the country. This is commonly referred to as the Area Code.

Each NXX is a three digit code loosely representing the Office Code of the serving switching node within each NPA (more specifically defined, an office code is formed by NPA and NXX). A node may serve more than one Office Code (i.e. NXX). However, typically only one switch node may serve a given NXX, hence, the uniqueness of the relationship of NXX's to switch nodes.

The XXXX is a four digit station number which provides a pointer or identification to the station's appearance on a given switch node. Combined with the associated NXX code, it gives a unique identification of a number within a given serving area (NPA), hence a Directory Number (DN) is formed.

When a customer dials a number (either 7 or 10 digits excluding prefixes), the switch node of the originating station is able to translate the dialled digits into a location for the called number, be it a location on the same switch or a route out of the switch to another switch node elsewhere in the switch network. Typically, the translations are setup to take advantage of the fact that office codes (NXX's) uniquely identify the switch node that the call is intended for. Thus, once the office code is determined, action is taken to route the call—either to route within the switch node (based on analysis of the station digits) or to choose an outgoing route to another switch node. It is the relationship of office codes (NXX's) to switch nodes that Local Number Portability (LNP) affects. To determine the correct switch node in the entire public network requires analysis of the full 10 digits in the dialled number.

Various proposals for LNP using an Advanced Intelligent Network (AIN) based solution have been suggested in "Generic Switching and Signalling Requirements for Number Portability" (FSD30-12-0001) dated Nov. 20, 1995 by the Illinois Number Portability Workshop. These AIN based LNP proposals rely on a query to an off-switch (i.e., "off-board") database which is used to track movement of numbers. Thus with AIN LNP, during each call event (i.e. origination), the originating switch must make a determination as to whether the called number is indeed on the switch or elsewhere in the switch network. If it is not on the originating switch, then the originating switch node (or some switch node) must "query" the "off-board" database to find out where the number is so that the call can be routed on the appropriate trunk group into the communication network. It does this on an on-going basis for any calls to "ported" numbers not located on the switch, even for numbers that are on the same switch they were on at the last query; there is no way to tell that a number has moved. It is this "continual" querying that adds substantial processing and costs to the network. In addition, because local area calling (or community of interest—COI calling) forms the majority of calls of the typical communication network, the added cost is significant for the operating company to provide local service for which the operating company typically receives a fixed monthly charge independent of usage.

Another proposal for Number Portability is made in U.S. Pat. No. 4,754,479, Bicknell et al, issued Jun. 28, 1988. According to this proposal, every switch in a portability cluster contains a common database which lists the station numbers in the cluster and specifies the particular switch connected to these station numbers. When a number is ported the common database is altered to indicate the new switch to which the ported number is now connected.

Bicknell et al suffers from the disadvantage that it requires a higher number of process steps adding to the complexity and response time of the system. In particular, it is necessary to establish by scanning a portability cluster table whether the switch to which the calling station is connected is part of the portability cluster. At a later stage it is necessary to translate the called station DN into an associated switch identity in the common database to indicate which switch the called station is physically connected to. Thus, even if a call is going from a first station physically connected to a switch to a second station physically connected to the same switch, both of the steps must be carried out. In addition, calls to unassigned numbers have to be routed to designated switches even though the number is not used.

SUMMARY OF THE INVENTION

It is an object of the present invention to provide a number portability scheme which involves fewer processing steps, is easily updated as numbers are ported, and does not rely on queries to an "off-board" database.

This is achieved by administrating individual switch node translations such that the "bulk" of the translations reside across all switch nodes in the portability cluster. This means replicated 7/10 digit translators in each switch node that include all station numbers for the cluster. The actual difference between the switches will be the outcome. On the switch node in the cluster where the station number resides (i.e., the actual physical appearance), the station number's or phone set's physical appearance will be found. On the switch nodes in the cluster where the station number does not reside, the result of the 7/10 translations will be a pointer/vector/route out to another switch node in the cluster. When a number is moved (i.e., ported) to another switch node in the cluster, the donor switch's (i.e., where the number left from) 7/10 translation is updated to point/vector/route to the recipient switch node in the cluster. The recipient switch node's 7/10 translation has to be updated to reflect that the station number is now resident on the switch node. All other switch nodes in the cluster have to have their 7/10 digit translations updated to point/vector/route to the recipient switch node. Because the bulk of the 7/10 digit translations have been previously expanded or replicated in all switch nodes in the cluster, this becomes a relatively easy task to manage, requiring a reduced number of replicated data changes (typically one or two) in each switch node.

Calls within a cluster to these kinds of ported numbers would not have to rely on the AIN LNP solution to route the call since the translations of all switches in the cluster are accurate and are able to translate the called station number accordingly.

For calls which originate outside the cluster and are directed towards the cluster an AIN query can be done at the originating switch to determine the correct switch node in the cluster to route the call to. Alternatively, such calls may simply be routed into the cluster, where they are then routed to the correct switch node.

An important operations note is that updates on the switch nodes need not be completely simultaneous. The correct order of update is:

1. Update the new serving switch node and the old serving switch node. All other switch nodes will route the call to the old switch node, which will route the call to the new one.
2. Update all other switch nodes in the cluster.

The invention may be summarized, according to a first aspect, as a switch for interconnecting stations physically connected to the switch with stations physically connected to other switches within a communications switching network by means of a dialled station number including an office code, the switch forming with at least some of the other switches in the network a portability cluster within which any station number may be ported from one switch to another, the switch having a processor provided with a main memory comprising a first translation table and a second translation table, wherein: the first translation table relates all office codes within the cluster to an instruction to translate the entire dialled station number and relates other office codes to respective instructions to route to another switch; and the second translation table includes all the station numbers for stations within the cluster, relates the station numbers physically connected to the switch to respective physical lines and relates all other station numbers to respective instructions to route to another switch.

According to another aspect, the invention provides a communications switching network comprising a plurality of switches physically connected to subscriber stations, at least some of the switches together defining a portability cluster within which any station number may be ported from one switch to another, each switch within the network having a processor provided with a main memory comprising a first translation table and a second translation table wherein for the switches within the cluster: the first translation table relates office codes within the cluster to an instruction to translate the entire dialled station number and relates all other office codes to respective instructions to route to another switch; and the second translation table includes all the station numbers for stations within the cluster, relates the station numbers physically connected to the switch to respective physical lines and relates all other station numbers to respective instructions to route to another switch.

According to yet another aspect, the invention provides in a communications switching network interconnecting a plurality of independent switches wherein each of said switches serves a plurality of subscriber stations and wherein at least some of the switches together define a portability cluster, a method for providing station number portability for subscriber stations within the cluster when at least one of the subscriber stations within the cluster is ported from one switch of the cluster to another switch of the cluster, said method comprising the steps of: dialling digits of a station number identifying a called station and including a switch office code portion when a calling one of said stations makes a call connection request; carrying out a first translation in the switch to which the calling station is connected of the office code portion in a first translation table, the first translation table relating all office codes within the cluster to an instruction to translate the entire dialled station number and relating all other office codes to respective instructions to route to another switch; when the first translation indicates an office code within the cluster, carrying out a second translation in the same switch of the entire dialled station number in a second translation table which includes all the station numbers for all stations within the cluster, relating the station numbers physically connected to the switch to respective physical lines and relating all other station numbers to respective instructions to route to another switch; and establishing connection between the calling station and the called station.

Note that instructions for routing to another switch may take the form of instructing that a query to a remote (AIN) database be made to determine the correct switch. Either the office code (first table) or the full number (second table) may be used to indicate that a query is required. In the second case, some numbers in the office code would be in the cluster, while others would not.

DETAILED DESCRIPTION OF THE PREFERRED EMBODIMENT

Figure 1:
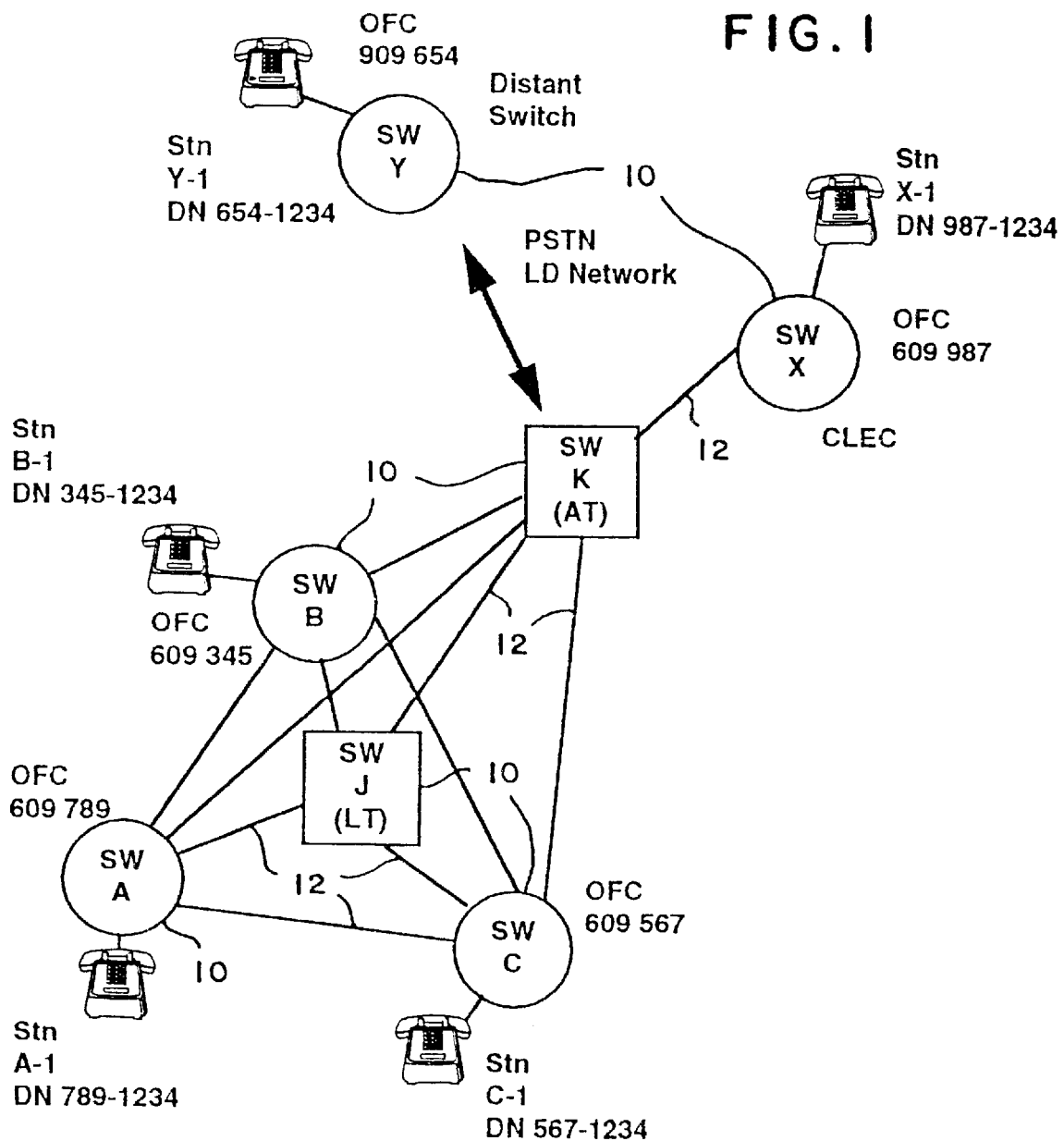
FIG. 1 illustrates a conventional public switched telephone network (PSTN) that does not offer number portability.

Referring to FIG. 1, a conventional PSTN typically comprises a plurality of switches 10 interconnected by trunks 12. More particularly, central offices are designated by circles and tandem switches are designated by squares. Switches A, B and C are central office switches all with the same NPA, namely 609. All the switches have an office code (OFC) consisting of the NPA plus a respective NXX. Thus, switch A has an OFC 609 789, switch B has an OFC 609 345 and switch C has an office code 609 567.

Each switch A, B and C has connected thereto a plurality of telephone stations each of which has a directory number (DN) consisting of the OFC of the switch to which it is connected plus a unique four digit number. Thus, all the stations connected to switch A have a DN beginning with 609 789. Only one station is shown connected to switch A, this being station A-1 the DN of which is 609 789 1234. Similarly, a station B-1 is shown with a DN 609 345 1234 connected to switch B and a station C-1 with DN 609 567 1234 is shown connected to switch C.

Also shown is a local tandem (LT) switch J which does not have telephone stations connected thereto but is provided to assist in establishing connection links between switches A, B, and C. LT translations would be similar to the other switches in the cluster.

All of the switches A, B and C are considered to fall within the same community of interest (COI). This could be defined as a city, part of a state or an entire state, part of a local access transport area (LATA) or the entire LATA. In the example shown all of the switches A, B and C are served by the same local exchange carrier (LEC) and all have the same area code or NPA, namely 609.

This cluster of switches forming the COI is connected through switch K to other switches outside the cluster. For example, switch K interconnects the cluster with a switch X which has an OFC 609 987. It can be appreciated that this switch has an identical NPA, namely 609, to switches A, B and C but it is outside the cluster because it is operated by a competitive local exchange carrier (CLEC).

Tandem switch K is also connected by a long distance (LD) network to a distant switch Y with an office code 909 654.

Each switch is provided with a processor (not shown) for establishing call connection between a calling station and a called station and each switch processor includes a main memory.

Figure 2A:
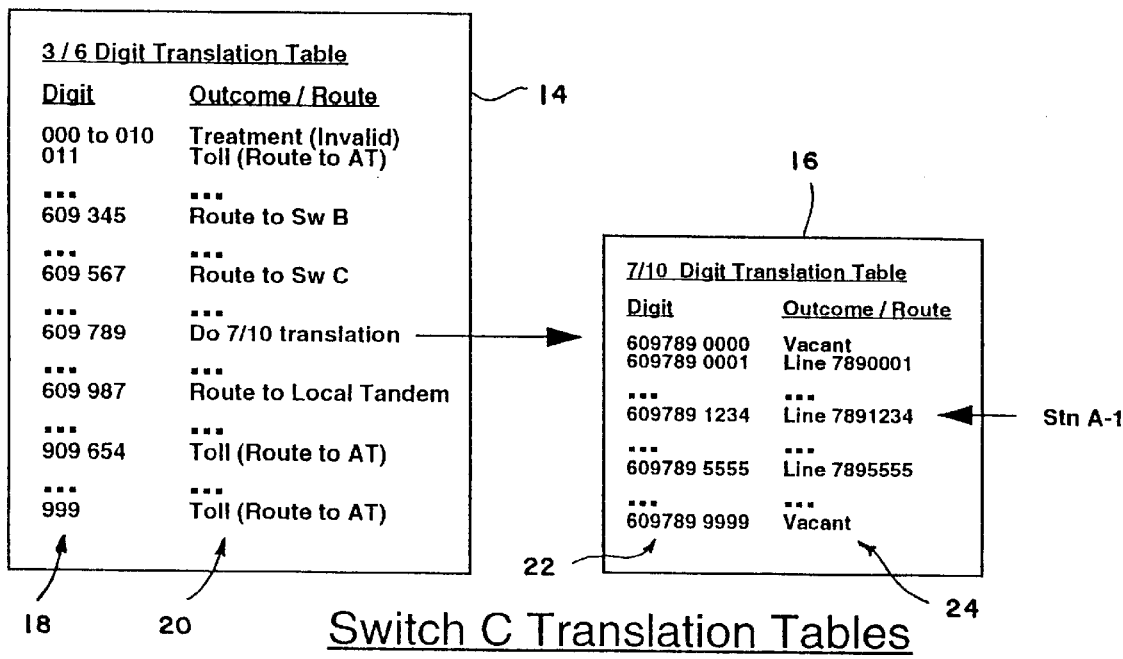
FIG. 2 illustrates the structure of two sets of translation tables incorporated in the memory of the switches of FIG. 1.
Figure 2B:
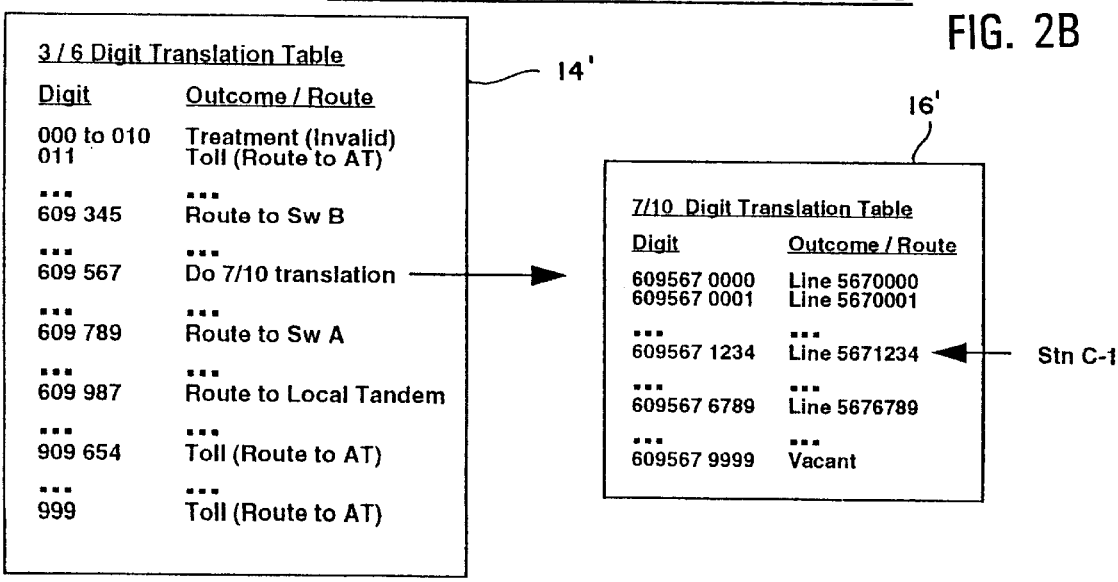

Referring now to FIG. 2, this shows two translation tables contained in the main memory of the processor of switch A and two translation tables contained in the main memory of the processor of switch C. The translation tables in switch A are a 3/6 digit translation table 14 and a 7/10 digit translation table 16.

The 3/6 digit translation table 14 comprises a "Digits" column 18 and an "Outcome/Route" column 20. The "Digits" column 18 includes all the six digit office codes in the network, specifically 609 345, 609 567, 609 789, 609 987 and 909 654 as well as digit combinations represented ranges 000 to 999 (or implied 000000 to 999999). Against each 3 or 6 digit number in column 18 is a corresponding outcome or route in column 20. Thus, opposite office code 609 345 in column 18 there appears "Route to SW B" which means that if the office code 609 345 is detected in a dialled number the appropriate route to be followed is through switch B. This is consistent with FIG. 1 which shows that the office code of switch B is 609 345 so that if switch A reads the first 6 digits of a dialled call to be 609 345 clearly the call has to be routed through switch B. Actually, for a local call the area code would not be dialled but the 609 would be inferred (i.e., defaulted to be the same as the originating station).

Against most of the other 6 digit numbers is a corresponding routing instruction. However, against number 609 789 is the instruction "Do 7/10 translation". This means that if office code 609 789 is dialled (with the 609 inferred) this is recognized by switch A as indicating a destination station on switch A and so no routing instruction is necessary. Instead, a direct 7/10 translation should be carried out on table 16. Various 3 digit numbers such as 011 and 999 indicate toll routing while any of 000 to 010 indicate an invalid number requiring special treatment such as playing of a recorded voice message.

Turning to table 16, this has a "Digits" column 22 and an "Outcome/Route" column 24. The "Digits" column 22 includes all of the 10 digit DNs of all of the stations connected to switch A, as many as 10,000. Again, the 609 may be inferred so that it appears that a 7 digit translation is taking place. Against each DN there is indicated on column 24 the status of the corresponding station, i.e., the station is present on a particular line or there is no such line (vacant) corresponding to the DN.

The translation tables in switch C are also a 3/6 digit translation table 14' and a 7/10 digit translation table 16'. The table 14' is virtually identical to table 14 except for two lines.

Specifically, against 609 507 is the instruction to "Do a 7/10 translation" and against 609 789 is "Route to SW A".

With regard to table 16', this is of the same configuration as table 16 except that the DN's listed are all those directly connected to switch C.

It should be understood that switch B would also be provided with similar 3/6 and 7/10 digit translation tables.

Figure 3:
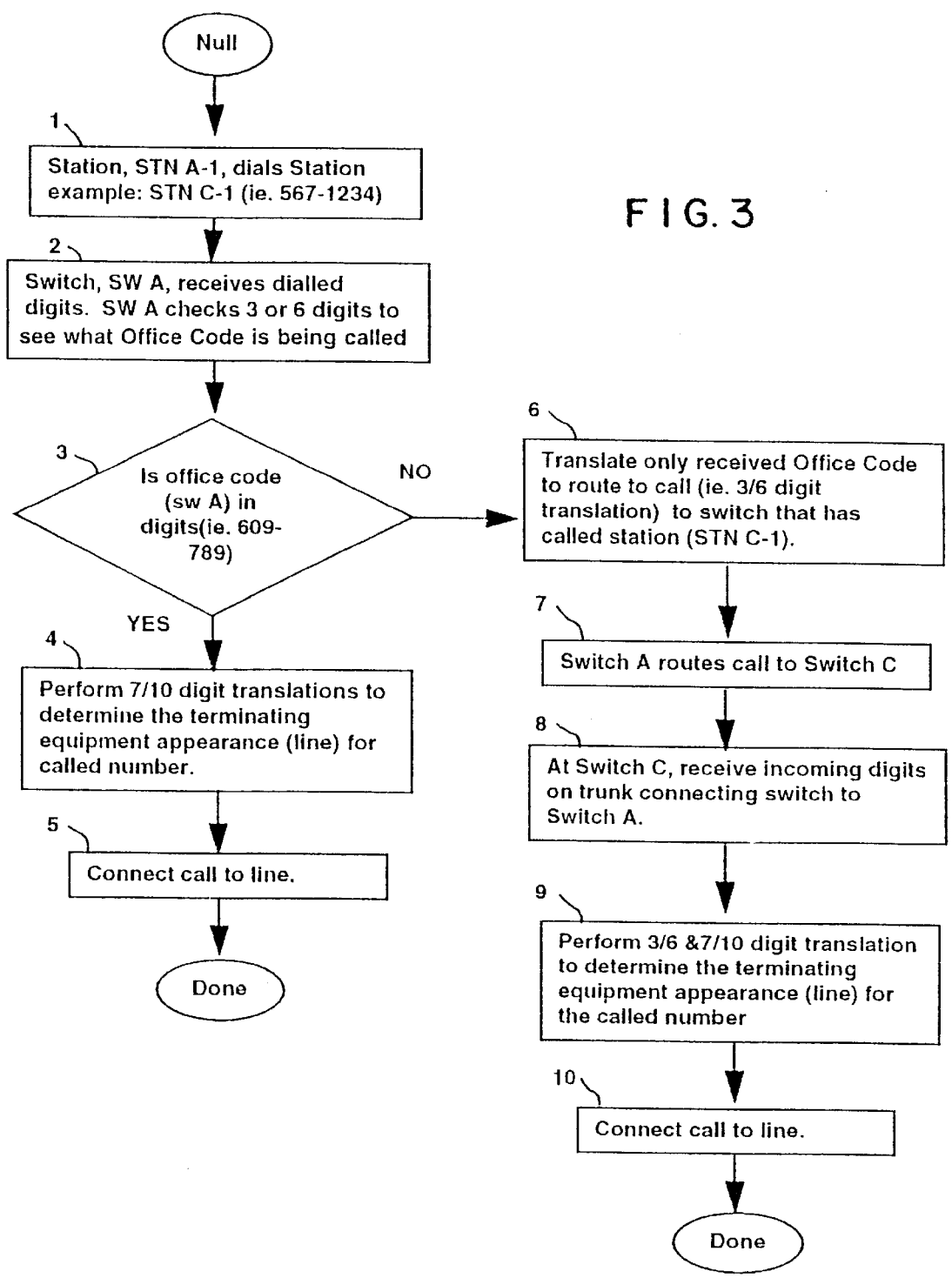
FIG. 3 is a flowchart illustrating the process steps that take place when a call is made using the conventional switching network of FIG. 1.

Referring now to FIG. 3, this shows the steps performed by the processors in progressing a call through the network of FIG. 1 incorporating the translation tables. Some of the steps involve conventional call processing operations which are well known in the art and will not be described in detail. At step 1, station A-1 dials station C-1 for example. At step 2 switch A receives the dialled digits and looks up the office code portion (3 or 6 digits) on translation table 14. The decision step 3 indicates two outcomes depending on whether the office code of the dialled digits is the same as or different from Switch A (i.e., 609 789).

If it is different, e.g., 609 567 if station C-1 is called, the process steps to 6 indicating that only a 3/6 digit translation is done giving an instruction "Route to SW C" from table 14.

Step 7 indicates switch A then routes the call to switch C. This is done in a conventional routing table that does not form part of the invention and will not therefore be discussed in detail. This routing table provides the best route for switch A to switch C. When the best route is selected connection is established between switch A and C. At switch C, as indicated at step 8, the incoming digits 609 567 1234 are received from switch A over the interconnecting trunk. Step 9 indicates that a 3/6 digit translation followed by a 7/10 digit translation is then carried out on table 14' and 16' respectively to determine the terminating equipment appearance (line) for station C-1.

Thereafter the call is connected to the line as indicated at step 10 using conventional call processing operations that are well known in the art and are not, therefore, discussed herein.

If the outcome of decision step 3 had been a "yes" indicating that the dialled office code is the same as that of switch A, the process would have advanced to step 4 indicating that a 7/10 digit translation should now be carried out in table 16. This is consistent with the instruction "Do 7/10 translation" opposite office code 609 789. Step 5 is a call connection step directed to step 10.

Figure 4:
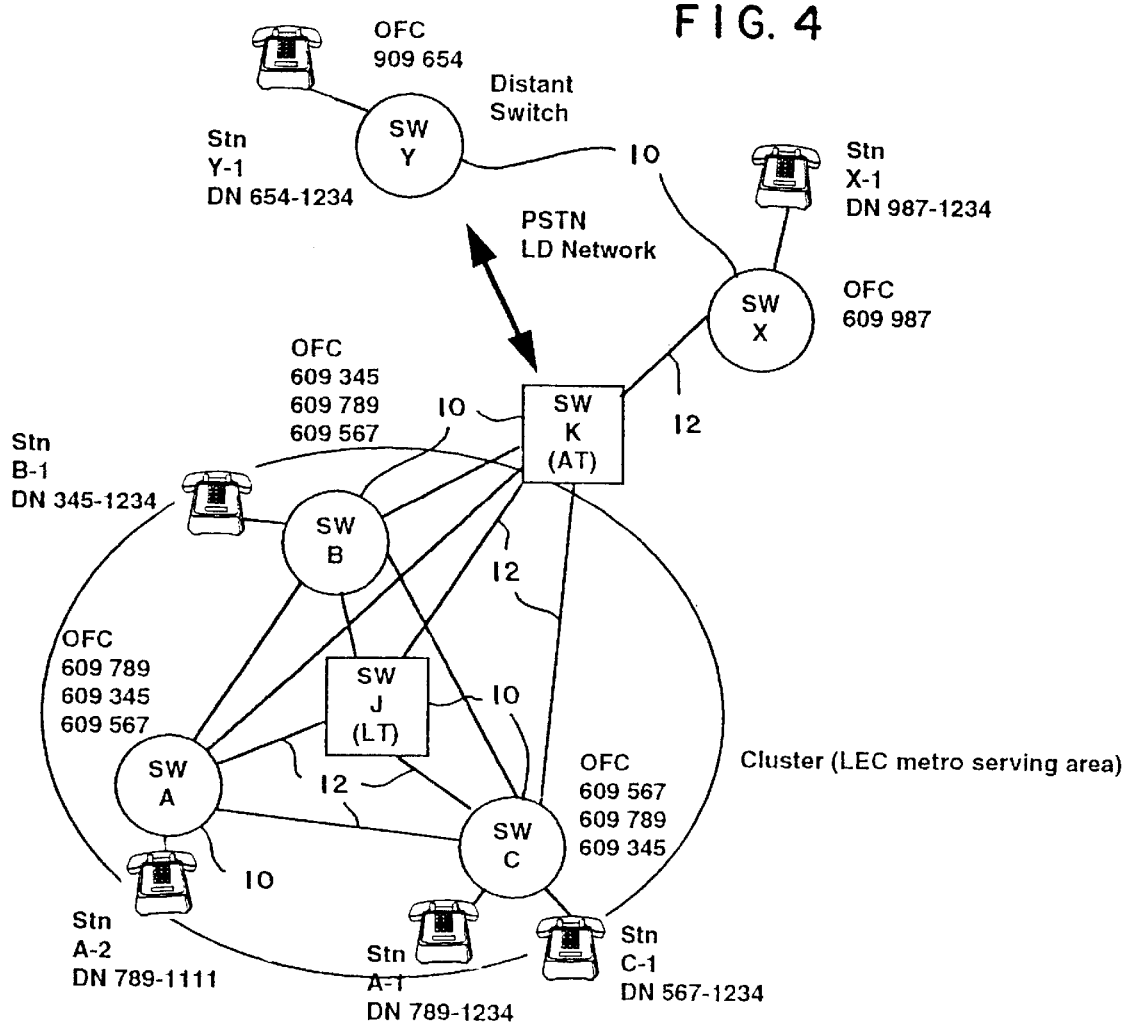
FIG. 4 illustrates a PSTN which has been adapted according to the invention to offer number portability.

Referring now to FIG. 4 which is a PSTN that has been adapted to provide number portability, the only difference between the initial set up of FIG. 4 and FIG. 1 is that present in the processor memory of each switch A, B and C in the cluster there is stored all the office codes that reside in the cluster. Thus, office code 609 789 for switch A and office code 609 345 for switch B and office code 609 567 for switch C are all present at each switch A, B and C. Also, in FIG. 4 station A-1 formerly connected to switch A and having DN 609 789-1234 has been ported to switch C, i.e., physically disconnected from switch A and reconnected to switch C.

Figure 5A:
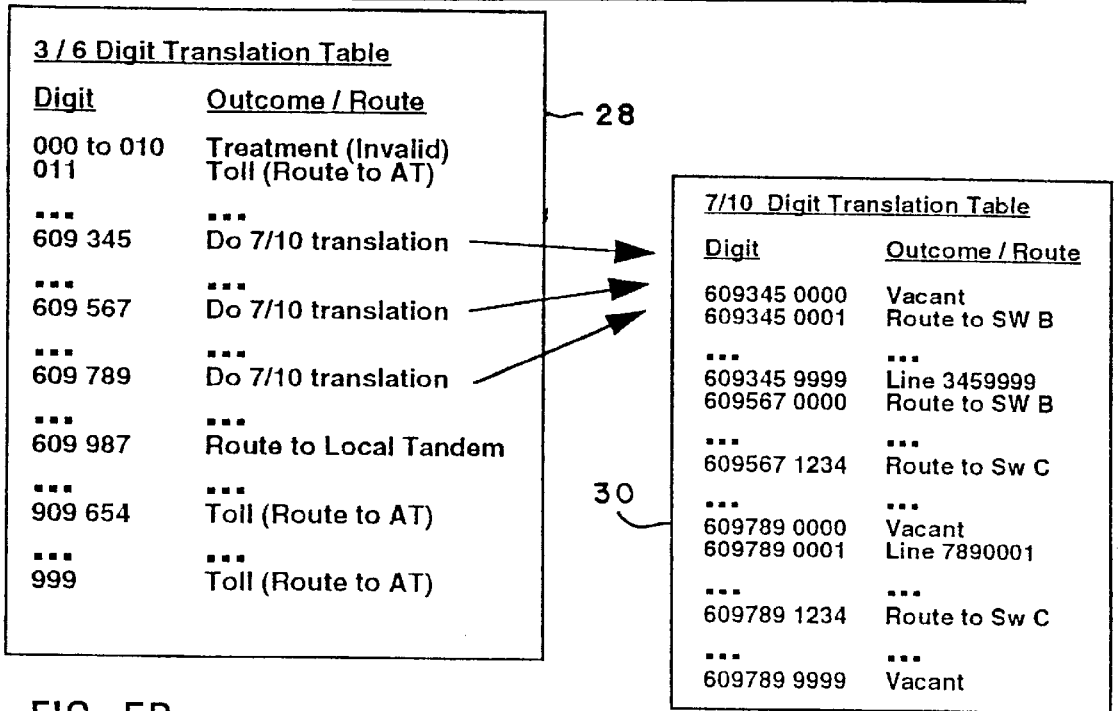
FIG. 5 is a view similar to FIG. 2 but illustrating the structure of two sets of translation tables incorporated in the memory of some of the switches of FIG. 4.
Figure 5B:
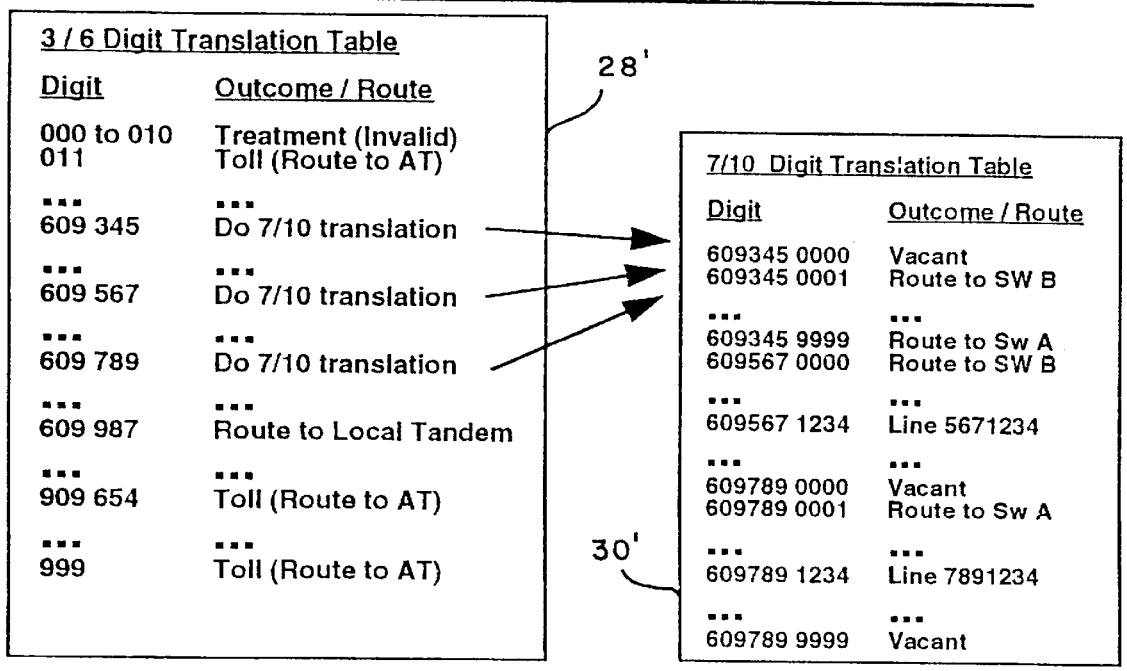

FIG. 5 shows the format of the 3/6 digit and 7/10 digit translation tables 28 and 30 for switch A and the corresponding translation tables 28' and 30' for switch C. By comparing table 14 of FIG. 2 with table 28 of FIG. 5 it can be seen that the difference is that, whereas in table 14 there is only one "Do 7/10 translation" instruction (relating to the office code of switch A) in table 28 there are three "Do 7/10 translation" instructions, one opposite each of the office codes of switches A, B and C. Thus, each local office switch in the cluster has stored in its processor main memory a 3/6 digit translation table containing the "Do 7/10 translation" instruction against all of the office codes of the local office switches.

By comparing table 16 of FIG. 2 with table 30 of FIG. 5 it can be seen that, whereas table 16 has entries for all station numbers associated with only one switch office code (609 789), table 30 has entries for all station numbers in the cluster, i.e., associated with all three office codes 609 789, 609 345 and 609 567. Thus table 30 needs three times the memory capacity of table 16.

The 3/6 digit translation table 28' of switch C is identical to table 28 unlike the conventional arrangement shown in FIG. 2 where there are slight differences between all the 3/6 digit translation tables. The corresponding 3/6 digit translation table of switch B and any other switch that might be in the cluster also is identical to table 28.

The 7/10 digit translation table 30' of switch C, like table 30, has entries for all station numbers in the cluster as has the corresponding 7/10 digit translation table of switch B and any other switch that might be in the cluster. However, these tables 30, 30' etc. are not identical because, where in one table a particular station number has opposite it an indication of a line, in the remaining tables opposite the same station number would be a "Route to" instruction. For example, in table 30 station number 609 345 9999 has "line 345 9999" indicated whereas station number 609 345 999 in table 30' has "Route to Sw A" against it. The same number in the corresponding table of Switch B would have "Route to Sw A" against it.

Figure 6:
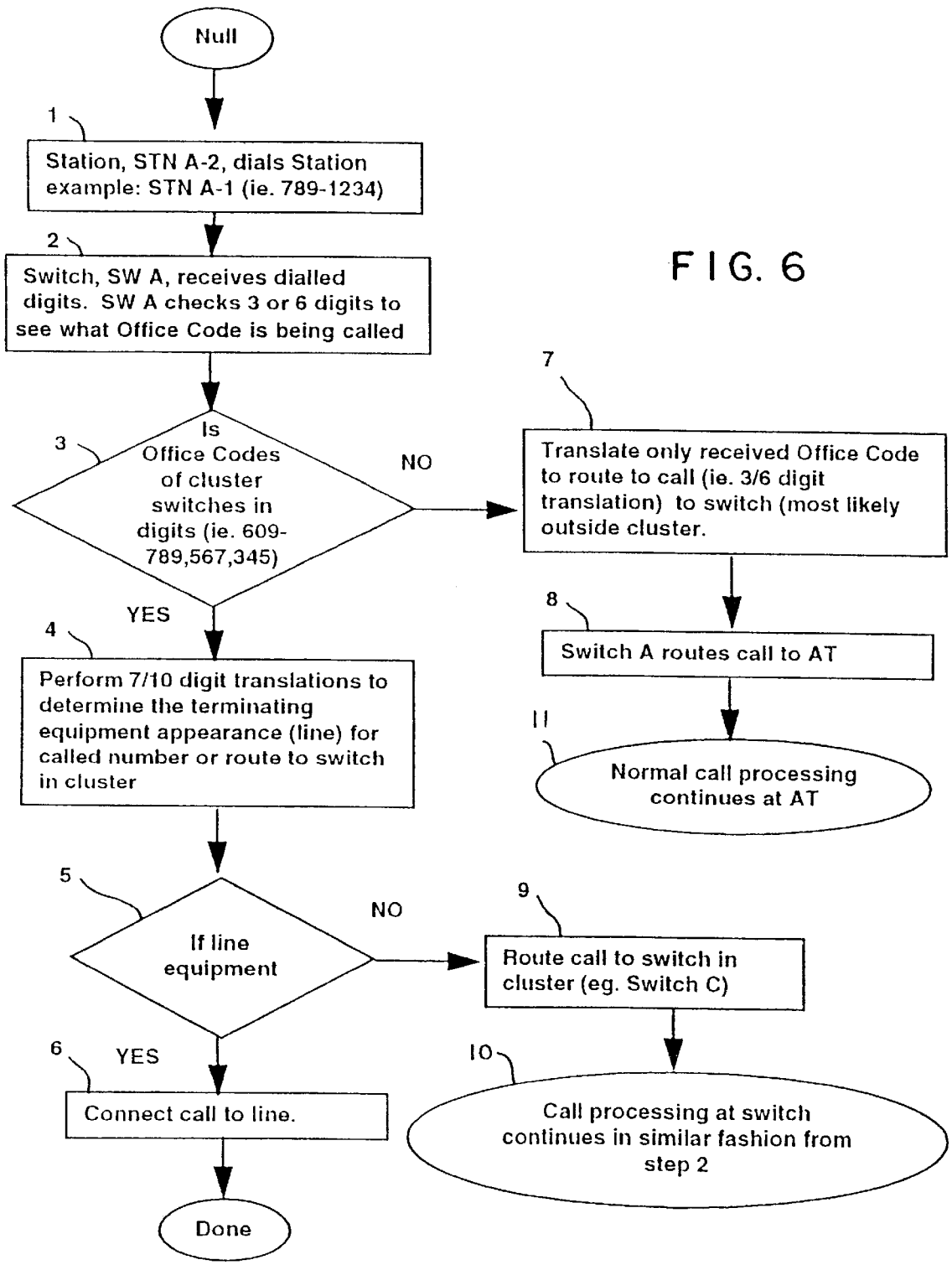
FIG. 6 is a flowchart illustrating the process steps that take place when a call is made using the switching network of FIG. 4.

FIG. 6 indicates processor steps which are performed to cause progress of a call through the network of FIG. 4 incorporating the translation tables of FIG. 5. As shown in FIG. 4, station A-1 which was originally physically connected to switch A has been physically moved or ported to switch C and it is assumed that a call is made from station A-2 to station A-1.

Step 1 shows station A-2 dialling station A-1. The digits dialled would be 789-1234. At step 2 switch A reviews the dialled digits and looks up the office code portion 609 789 (the 609 having been inferred as described previously) on translation table 28. The decision step 3 indicates two outcomes depending on whether or not the office code of the dialled digits is one of the three office codes 609 345, 609 567 and 609 789 in the cluster. In this case the office code of the dialled digits is 609 789 (for station A-1) and so the process moves to step 4 indicating that a 7/10 digit translation is done on the station number dialled to determine the terminating equipment. This is consistent with FIG. 5 which shows in table 28 that when 609 789 appears the instruction "Do 7/10 translation" results. Continuing to refer to FIG. 5, the 7/10 translation is carried out in table 30 and the outcome as indicated at step 5 of FIG. 6 is either an indication of terminating line equipment or a routing instruction. In the case of station number 609 789 1234 it can be seen from table 30 that this translates to "Route to Sw C" which is, of course, consistent with the fact that station A-1 had been ported to switch C.

Step 9 indicates that the call is then routed to switch C. The routing information is obtained from a conventional routing table stored in the main memory of the processor of switch A. Step 10 indicates that call processing continues in Switch C in a similar fashion from Step 2. Thus, when the call arrives at Switch C over the trunk the translation tables 28' and 30' are then looked up and the 7/10 translation shows that 609 789 1234 corresponds to line 789 1234. Thereafter the call is connected to the line.

Reverting to FIG. 6, if the 7/10 digit translation in table 30 of switch A had indicated termination to line equipment rather than a routing instruction the call would then be connected to the line at step 6.

Reverting to decision step 3 of FIG. 6, if the dialled office code portion was different from all three cluster office codes this would lead to step 7 which indicates that only the 3/6 digit translation is carried out to provide routing information via access tandem switch K. This is consistent with table 28 of FIG. 5 which shows there is no 7/10 translation for office codes other than the three cluster office codes. Step 8 indicates the routing of the call to the appropriate switch outside the cluster, e.g. access tandem switch K. The routing information again is obtained from the conventional routing table in switch A. Step 11 indicates that normal processing is then carried out at the switch outside the cluster, e.g. access tandem switch K. If the access tandem is considered part of the cluster, then its translations would be similar to that of the cluster. This would allow efficient routing of outside calls into the cluster (i.e., for ported numbers in the cluster). If the access tandem is not considered part of the cluster, then "normal" PSTN translations would take place. Outside calls (to ported numbers) into the cluster would go to the donor" switch which would "tandem" the call to the destination switch.

It is noted that when a number is ported from one switch to another within the cluster no changes are needed in the 3/6 digit translation tables 28, 28' etc.

It is noted also that in the embodiment described the entire contents of all of the 3/6 digit translation tables within the cluster are identical. However, this is not necessarily the case. It is essential only that the translations relating to the switches in the cluster be identical, i.e., that every 3/6 digit translation table include the "Do 7/10 translation" against the office codes of all switches in the cluster. It is possible that some of the other translations relating to office codes of switches outside the cluster could be different.

Additionally, although in the embodiment described an off-board database is not used, it is within the ambit of the invention to include the use of an off-board database as appropriate. For example, if the call is from the portability cluster to a CLEC portability cluster, we could do a query to an off-board AIN database to determine the actual line connection within the CLEC cluster. Similarly, the AT routing instruction could be replaced by an AIN database query. The actual change in the 3/6 digit translation table would be the outcome "Do AIN Query" instead of "Route to AT".

Furthermore, in the embodiment described the 7/10 digit translation table includes only entries for the station numbers in the portability cluster but, in certain circumstances, it might be appropriate to include additionally in the 7/10 digit translation table other station numbers. These could be station numbers having an office code which is the same as one of the office codes in the portability cluster but which belongs to a switch which is not technically part of the portability cluster.

These additional station numbers could also be station numbers having an office code which is not the same as one of the office codes within the portability cluster. In this case the first translation table would have to include a "Do 7/10 translation" for this additional office code. Whether or not the additional station numbers have an office code the same as one of the office codes in the portability cluster, these additional station numbers would have routing information either in the form of "Route to SW" or in the form "Do AIN Query".

By providing this additional information in the 7/10 digit translation table greater call efficiency can be achieved by the switches within the portability cluster. For example, if a station number has been ported from within the portability cluster to a switch outside the cluster or has been ported from outside the portability cluster to a switch within the portability cluster routing information to the new switch can be obtained more directly.

It is noted that these switches outside the cluster can belong to the same LEC network as the cluster or to a nearby CLEC network. It is noted also that the switches which are not within the cluster do not have translation tables equivalent to the translation tables of the switches within the cluster and do not therefore provide the same portability functionality.

Because the 7/10 digit translation tables 30, 30', etc. have a common structure containing records for all directory numbers, it is relatively easy to administer a single change in each switch in the cluster when the station moves with its directory number. In the switch that the station was previously connected to the "Line . . . " is changed to "Route to (new switch)" and in the switch the station is now connected to the "Route to . . . " is changed to "Line . . . ".

Thus, number portability can be obtained by making a change to the second (7/10 digit) translation table of the old switch and of the new switch. It is not essential to change the translation tables of the other switches in the cluster as they will all route the call to the old switch which will then reroute to the new switch. However, as an additional step, in all the other switches in the cluster the "Route to . . . " instruction in the second translation table could be changed to another "Route to . . . " instruction to specify the new switch the station is now connected to.

FIG. 6 describes the processing of a call originating inside the portability cluster. When a call originates outside the portability cluster and the station which is being called resides within the cluster similar processing steps occur once the DN of the dialled station arrives at a switch within the cluster.

Moreover, although the invention is primarily intended for use in a PSTN it could also be used in a private network.

It is noted that the invention has been described in relation to the North American Number Plan but of course the invention is applicable irrespective of the exact format of the Number Plan.

It should be understood that the invention relates to number portability and is applicable to a situation in which the consumer has physically moved to another geographic location (geographic portability) or to a situation in which the consumer has simply changed local service providers (service provider portability).

It should also be understood that the number portability technique described can, in its broadest application, be used either with in-band or common channel signalling. An AIN based approach according to the prior art, on the other hand required CCS7 which is a common channel signalling standard.

We claim:

1. A switch for interconnecting stations physically connected to the switch with stations physically connected to other switches within a communications switching network by means of a dialled station number including an office code, the switch forming with at least some of the other switches in the network a portability cluster within which any station number may be ported from one switch to another, the switch having a processor provided with a main memory comprising a first translation table and a second translation table, wherein:

the first translation table relates all office codes within the cluster to an instruction to translate the entire dialled station number and relates other office codes to respective instructions to route to another switch; and the second translation table includes all the station numbers for stations within the cluster, relates the station numbers physically connected to the switch to respective physical lines and relates all other station numbers to respective instructions to route to another switch.

2. A switch according to claim 1 in which the first translation table is a 3/6 digit translation table and the second translation table is a 7/10 digit translation table.

3. A switch according to claim 2 in which the first translation table comprises a "Digits" column containing a plurality of three or six digit combinations representing the office codes of all switches connected to the switch and an "Outcome/Route" column providing against the digit combinations representing the office codes of switches within the portability cluster an instruction to carry out a 7/10 digit translation and in which the second translation table comprises a "Digits" column containing a plurality of seven or ten digit combinations including the three or six digit combinations representing the office codes of switches within the portability cluster and an "Outcome/Route" column providing against the seven or ten digit combinations information that a particular combination is connected to a specific line or an instruction to route to another switch.

4. A switch according to claim 1 in which at least one of the instructions in the first translation table to route to another switch is in the form of an instruction to query an off-switch database.

5. A switch according to claim 1 in which the second translation table includes additional station numbers which are not within the portability cluster but which have an office code which is the same as one of the office codes in the portability cluster, the second translation table providing instructions to route to another switch for those additional station numbers.

6. A switch according to claim 5 in which at least one of the instructions for the additional station numbers to route to another switch is in the form of an instruction to query an off-switch database.

7. A switch according to claim 1 in which the first translation table relates at least one additional office code which is not the same as one of the office codes in the portability cluster to an instruction to translate the entire dialled station number and the second translation table includes all the (additional) station numbers for stations having the additional office code, the second translation table providing instructions to route to another switch for these additional station numbers.

8. A switch according to claim 7 in which at least one of the instructions for the additional station numbers to route to another switch is in the form of an instruction to query an off-switch database.

9. A communications switching network comprising a plurality of switches physically connected to subscriber stations, at least some of the switches together defining a portability cluster within which any station number may be ported from one switch to another, each switch within the network having a processor provided with a main memory comprising a first translation table and a second translation table wherein for the switches within the cluster:

the first translation table relates all office codes within the cluster to an instruction to translate the entire dialled station number and relates other office codes to respective instructions to route to another switch; and the second translation table includes all the station numbers for stations within the cluster, relates the station numbers physically connected to the switch to respective physical lines and relates all other station numbers to respective instructions to route to another switch.

10. A network according to claim 9 in which, for each switch within the portability cluster, the first translation table is a 3/6 digit translation table and the second translation table is a 7/10 digit translation table.

11. A network according to claim 10 in which, for each switch within the portability cluster, the first translation table comprises a "Digits" column containing a plurality of three or six digit combinations representing the office codes of all switches connected to the switch and an "Outcome/Route" column providing against the digit combinations representing the office codes of switches within the portability cluster an instruction to carry out a 7/10 digit translation and in which the second translation table comprises a "Digits" column containing a plurality of seven or ten digit combinations including the three or six digit combinations representing the office codes of switches within the portability cluster and an "Outcome/Route" column providing against the seven or ten digit combinations information that a particular combination is connected to a specific line or an instruction to route to another switch.

12. A network according to claim 9 in which, for each switch within the portability cluster, at least one of the instructions in the first translation table to route to another switch is in the form of an instruction to query an off-switch database.

13. A network according to claim 9 in which, for each switch within the portability cluster, the second translation table includes additional station numbers which are not within the portability cluster but which have an office code which is the same as one of the office codes in the portability cluster, the second translation table providing instructions to route to another switch for those additional station numbers.

14. A network according to claim 13 in which at least one of the instructions for the additional station numbers to route to another switch is in the form of an instruction to query an off-switch database.

15. A network according to claim 9 in which, for each switch within the portability cluster, the first translation table relates at least one additional office code which is not the same as one of the office codes in the portability cluster to an instruction to translate the entire dialled station number and the second translation table includes all the (additional) station numbers for stations having the additional office code, the second translation table providing instructions to route to another switch for these additional station numbers.

16. A network according to claim 15 in which at least one of the instructions for the additional station numbers to route to another switch is in the form of an instruction to query an off-switch database.

17. In a communications switching network interconnecting a plurality of independent switches wherein each of said switches serves a plurality of subscriber stations and wherein at least some of the switches together define a portability cluster, a method for providing station number portability for subscriber stations within the cluster when at least one of the subscriber stations within the cluster is ported from one switch of the cluster to another switch of the cluster, said method comprising the steps of:

dialling digits of a station number identifying a called station and including a switch office code portion when a calling one of said stations makes a call connection request;

carrying out a first translation in the switch to which the calling station is connected of the office code portion in a first translation table, the first translation table relating all office codes within the cluster to an instruction to translate the entire dialled station number and relating all other office codes to respective instructions to route to another switch;

when the first translation indicates an office code within the cluster, carrying out a second translation in the same switch of the entire dialled station number in a second translation table which includes all the station numbers for all stations within the cluster, relating the station numbers physically connected to the switch to respective physical lines and relating all other station numbers to respective instructions to route to another switch; and establishing connection between the calling station and the called station.

18. A method according to claim 17 comprising, in a case where a station is ported from a first switch to a second switch within the portability cluster, the initial steps of changing in the second translation table of the first switch an indication of a physical line for the station number of the ported station to an instruction to route to the second switch, and changing in the second translation table of the second switch an instruction for the station number of the ported station to route to the first switch to an indication of a physical line.

19. A method according to claim 18 comprising the further step after the initial steps of changing in the second translation table of all other switches within the portability cluster an instruction for the station number of the ported station to route to the first switch to an instruction for the station number of the ported station to route to the second switch.

* * * * *